3,170,116
APPARATUS FOR MEASURING THE INTENSITY AND PARTICLE VELOCITY OF A BEAM OF ELECTRICALLY CHARGED PARTICLES
William B. Farrington, Upper Montclair, N.J., assignor to Farrington Engineering Corporation, Upper Montclair, N.J., a corporation of Delaware
Filed June 20, 1960, Ser. No. 37,334
4 Claims. (Cl. 324—70)

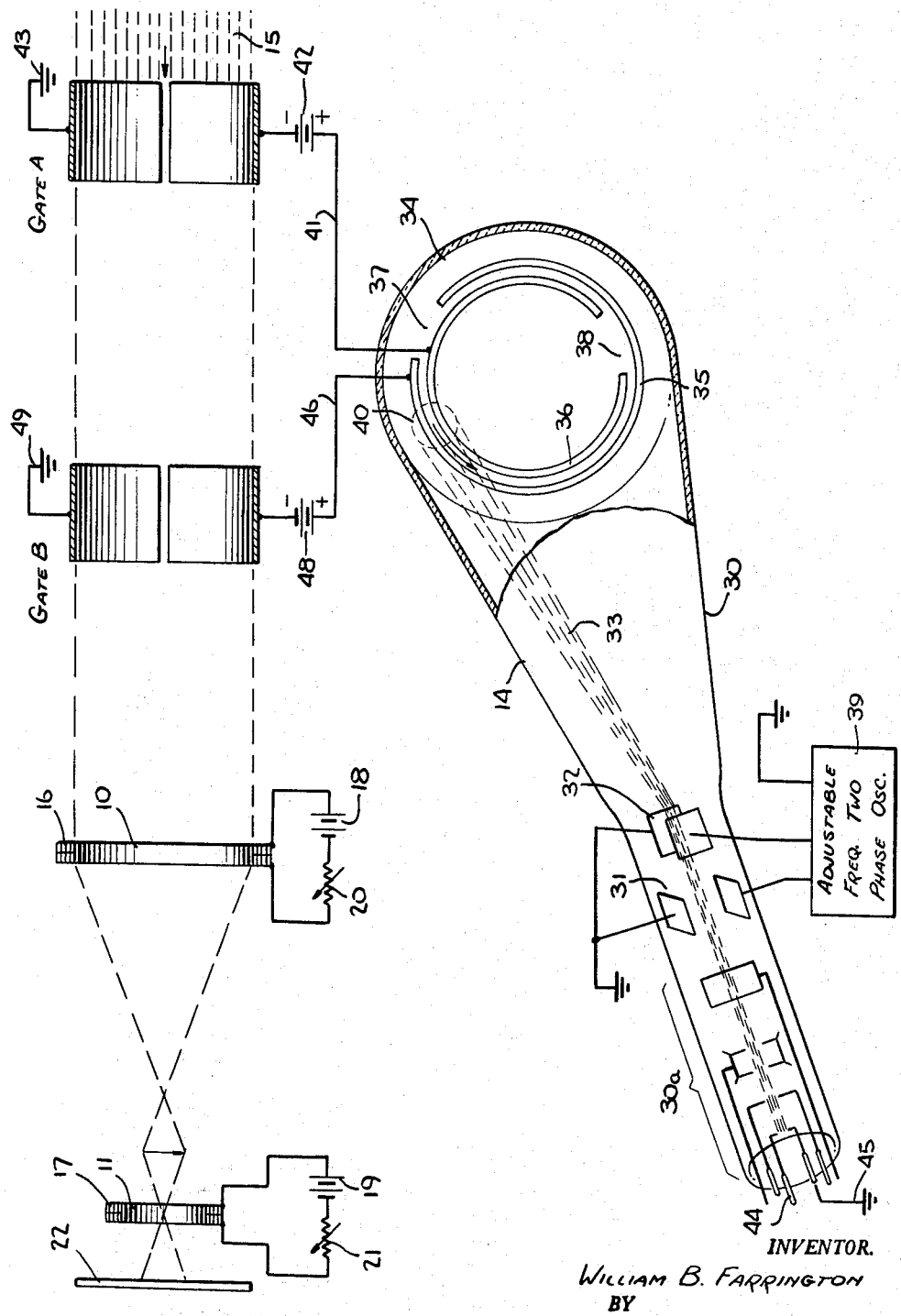

This invention pertains to an electron telescope apparatus for providing wide aperture focusing of a stream of electrons or other electrically charged particles, and more specifically for selectively focusing the same according to particle velocity where the latter is subject to variation in range.

The invention finds particular application for investigating the streams of such particles incident in the outer atmosphere from the sun or other stellar bodies or from inter-stellar space.

For providing wide aperture focusing of such streams the electron telescope of the invention comprises a pair of electron lenses in the form of direct current energized coils, one a relatively large diameter objective lens and the other a smaller diameter amplifying lens, these lenses being coaxially mounted in appropriately spaced relation.

Such a lens system suffices for the sharp focusing of a stream of electrically charged particles moving at the same velocity in a common direction. In general, however, the velocities of the individual charged particles of a moving stream are not the same, but in aggregate extend over a range of values, such that the particles are focused in accordance with their respective velocities at different distances along the axis of the simple lens system above described, with resulting aberration or incapability of being sharply focused on any image plane.

To eliminate this defect, the invention provides in conjunction with the electron telescope above described, a pair of electrical gates disposed coaxial with the lens system preferably in advance thereof, these gates being appropriately spaced apart as hereinafter described.

These gates preferably take the form of parallel disposed pairs of metal plates, with the respective plates of each pair mounted equi-distantly on opposite sides of the lens system axis. Or the plates may have a semi-cylindrical, arcuate contour. A direct current voltage is impressed between the plates of each pair through electronic switching means, such as momentarily to remove the voltage from the gates in timed sequence in the direction of flow of the charged particle stream.

During intervals that these voltages are impressed on the gates, transmission of the electron stream to the lens system is completely suppressed by angular deflection of the stream passing through the first gate away from the path of the second and by similarly deflecting any trailing portion of the stream passing through the second gate away from the objective lens. Negatively charged particles in the stream will of course be deflected in the direction of the positively charged plate of each gate and vice versa for positively charged particles. In this way the gates are in effect closed by application of the voltage thereto and are opened by the removal of said voltage.

In order momentarily to transmit to the lens system only those particles of the incident stream which have substantially the same velocity, the first gate is opened momentarily to transmit a short pulse of the incident stream to the second gate, and this gate is opened in timed sequence therewith to transmit to the objective lens only those particles having substantially the same velocity, the velocity of particles thus transmitted being preselected in accordance with the timed sequence in which the first and second gates are respectively momentarily opened and then closed.

Thus assuming the individual particle velocities of the incident stream to vary over a considerable range, then at the instant the first gate is opened, all particles of the wave front thus transmitted to the second gate will start from the first gate at the same instant but will move toward the second gate at varying speeds. The particles moving faster than the preselected velocity will arrive at the second gate before it is opened and thus be diverted, while those moving slower than the preselected velocity will arrive at the second gate after it has been opened and closed again and will thus be diverted away from the lens system. As a result only those particles which have velocities of substantially the preselected value will be transmitted through both gates to the lens system, and thus be brought to a sharp image.

Any suitable switching means may thus be employed in accordance with the invention for periodically opening and closing the gates in the timed sequence above described. An appropriate such switching means is a cathode ray tube having a pair of concentric metal rings secured to the inner face of its screen, each ring being interrupted by a gap, with the gaps of the respective rings angularly displaced from one another. The biasing voltages for the respective gates are connected between these rings respectively and a plate of each gate, the opposite plates being grounded, as is the cathode of the tube, and the biasing voltages having their positive terminals connected to the rings whereby the gates are voltage biased through the cathode beam of the tube, the cathode of which is grounded.

The cathode beam has imparted thereto a circular trace by means of a two phase oscillator, the phases of which are connected respectively to its deflecting plates, the cathode beam being so focused as to span both rings. Thus as the beam sweeps around its circular trace, it maintains the biasing voltages on both gates until it reaches the gap in the ring connected to the first gate, whereupon this gate is momentarily opened and then closed. A timed interval later the cathode beam reaches the gap in the ring connected to the second gate whereby the latter is momentarily opened and then closed. By adjusting the frequency of the two-phase oscillator, the periodicity of sweep of the cathode beam may be varied as desired, thereby to open and close the gates in timed sequence such as to transmit to the lens system, the charged particles of the stream having any preselected velocity.

Any other suitable type of electronic switching means may be employed such for example as a multi-vibrator or so called "flip-flop" type of oscillator.

Having thus described the invention in general terms, reference will now be had, for a more detailed description to the accompanying drawing, referring to which the objective lens of the electron telescope is shown at 10, the amplifying lens at 11, the gates at A and B, and the cathode ray switching tube at 14. The beam of electrically charged particles incident on the apparatus is indicated generally at 15, and may comprise only electrons, or only a stream of positively charged or ionized heavier particles, or a mixture of the two, the individual particles of the stream being assumed as indicated on the drawing to be moving along substantially parallel paths, which are parallel to the axis of the lens system 10, 11.

As above explained, the lenses 10 and 11 are coaxially mounted as shown, and comprise, respectively, a relatively large diameter objective lens 10, disposed in the direction of the incident charged particle beam 15, while lens 11 is of smaller diameter as shown and functions as an amplifying lens, being disposed on the opposite side of the objective lens 10 from that of the incident beam 15. Each lens comprises a coil of wire, as indicated at 16, 17, energized from a direct current voltage source, as at 18, 19, connected to the associated coil through an adjustable resistance, as at 20, 21, for varying the magnitude of current flow through the associated coil, thereby to vary the focal length of the lens. A phosphorescent screen 22 or other suitable indicating element is mounted at the image plane of lens 11 for indicating the intensity of the image formed by the focused beam incident thereon.

The cathode ray tube switching device 14 is of generally conventional construction as regards the tube structure, except as noted below, and consists of the conventional glass or glass-and-metal, hermetically sealed envelope or container 30, housing therein a gun structure of conventional design, as indicated at 30a, and pairs of deflecting plates, as 31 and 32, disposed at right angles to each other, so that when energized from a two-phase alternating current source, the electron beam 33 is deflected in a circular trace onto the screen 34 of the tube. Secured to the inner face of the end 34 of the tube which would normally carry the screen (not here required), are a pair of concentric metal strips 35, 36, each being interrupted by a gap, as at 37, 38, these gaps being angularly disposed with respect to each other as shown by the relative positioning thereof. For deflecting the cathode beam 33 of the tube in a circular trace, the deflecting plates 31 and 32 are connected to an adjustable frequency, two-phase oscillator 39, and the focusing of the cathode beam is such as shown in the drawing, that when incident on the screen end 34, it spans the metal rings of strips 35, 36, in the manner indicated at 40.

The inner metal ring or strip 36 of the cathode tube is connected over a lead 41 and thence through a direct current voltage source 42, to the lower plate of gate A, and in polarity such that the negative terminal of the voltage source is connected to the gate plate as shown. The upper plate of this gate is grounded, as at 43. The cathode 44, of tube 14, is also grounded as at 45. The outer metal ring 35 of the tube is connected over a lead 46 and thence through a direct current voltage source 47, to the lower plate of gate B as shown, and with the negative terminal of battery 47 connected to this plate. The upper plate of this gate is grounded as at 49.

In the operation of the apparatus shown in the drawing, the frequency of oscillator 39 is adjusted to transmit through gates A and B those charged particles of the incident beam 15 having a preselected velocity, the tube 14 being of course otherwise appropriately energized to sweep the cathode beam 33 in a counterclockwise circular trace about the screen end 34. In this way the charged particles of the incident beam 15 having the selected velocity are transmitted through the gates A and B, due to the timed sequence in which these gates are respectively opened and closed by the sweep of the cathode beam 33 past the gaps 38 and 37 in the rings 36 and 35, respectively. The currents in the lens coil 10 and 11 are appropriately adjusted by means of the variable resistors 20 and 21 to focus the transmitted beam of charged particles on the screen 22, thus to indicate the intensity of the beam for the particles having the selected velocity. For transmitting to the screen 22 charged particles of the incident beam 15 having any other preselected velocity, the frequency of the oscillator 39 is appropriately adjusted, to vary the periodicity of sweep of the cathode beam 33.

What is claimed is:

1. Apparatus for measuring the intensity and particle velocity of a beam of electrically charged particles, comprising: a pair of electrical gates disposed at spaced points along the path of said beam, means for electrically energizing said gates to suppress said flow therethrough, switching means for momentarily de-energizing said gates in a pre-selected time sequence, to transmit through said gates successively, particles of said beam flowing at a preselected velocity, electron telescope means disposed along said path beyond said gates in the direction of particle movement for focusing said transmitted particles on a plane therebeyond, and means at said focusing plane for indicating the intensity of the beam of particles thus transmitted at any point in the image formed thereby.

2. Apparatus for measuring the intensity and particle velocity of a beam of electrically charged particles, comprising: a pair of electrical gates disposed at spaced points along the path of said beam, means for electrically energizing said gates to suppress said flow therethrough, switching means for momentarily de-energizing said gates in a pre-selected timed sequence, to transmit through said gates successively, particles of said beam flowing at a pre-selected velocity, means disposed along said path beyond said gates in the direction of particle movement for focusing said transmitted particles on a plane therebeyond, means at said focusing plane for indicating the intensity of the image formed by the beam of particles thus transmitted, said focusing means comprising a pair of spaced coils, coaxial with the path of said beam, and direct current means for energizing said coils, respectively, in the direction to focus said beam.

3. Apparatus for selectively measuring the intensity and particle velocity of a beam of electrically charged particles, comprising: a pair of electrical gates disposed at spaced points along the path of said beam, direct-current, potential means for electrically energizing said gates to suppress said particle flow therethrough, electronic switching means for momentarily de-energizing said gates in a pre-selected timed sequence to transmit through said gates successively, particles of said beam flowing at a pre-selected velocity, electron telescope means disposed along said path beyond said gates in the direction of particle movement for focusing said transmitted particles on a plane therebeyond, and means at said focusing plane for indicating the intensity of the image formed by the beam of particles thus transmitted.

4. Apparatus for selectively measuring the intensity and particle velocity of a beam of electrically charged particles, comprising: a pair of electrical gates disposed at spaced points along the path of said beam, direct-current, potential means for electrically energizing said gates to suppress said particle flow therethrough, electronic switching means for momentarily de-energizing said gates in a pre-selected timed sequence to transmit through said gates successively, particles of said beam flowing at a pre-selected velocity, means disposed along said path beyond said gates in the direction of particle movement for focusing said transmitted particles on a plane therebeyond, means at said focusing plane for indicating the intensity of the image formed by the beam of particles thus transmitted, said focusing means comprising a pair of coils, disposed coaxially along the path of said beam, direct current means for energizing said coils in the direction to focus said beam, the first said coil in the direction of particle movement being of relatively large diameter and functioning as an objective electron lens, and the second coil being of relatively smaller diameter and functioning as an amplifying electron lens.

References Cited by the Examiner

UNITED STATES PATENTS

| | | | |
|---|---|---|---|
| 2,356,535 | 8/44 | Ruska | 317—200 X |
| 2,422,943 | 6/47 | Bachman | 250—49.5 |
| 2,429,558 | 10/47 | Marton | 317—200 X |
| 2,730,652 | 1/56 | Gutton | 250—49.5 |
| 2,945,123 | 7/60 | Parsons et al. | 250—41.9 |

FOREIGN PATENTS 747,977   4/56   Great Britain.

WALTER L. CARLSON, *Primary Examiner.*

LLOYD McCOLLUM, *Examiner.*